United States Patent
Levy

[15] 3,692,899
[45] Sept. 19, 1972

[54] INHIBITION OF TRANSPLANTED TUMOR GROWTH BY POLYINOSINIC-POLYCYTIDYLIC ACID IN MICE

[72] Inventor: Hilton B. Levy, Bethesda, Md.

[73] Assignee: The United States of America as represented by the Secretary, Department of Health, Education and Welfare

[22] Filed: Dec. 17, 1969

[21] Appl. No.: 885,817

[52] U.S. Cl. .................................................424/180
[51] Int. Cl. .............................................A61k 27/00
[58] Field of Search.......................................424/180

[56] References Cited

OTHER PUBLICATIONS

Field et al., Biochemistry, Vol. 58, 1967, pages 1004–1010.

Andrewes, Viruses of Vertebrates, Williams and Wilkins Co., Balto., MD., 1964, pages 171– 180.

Primary Examiner—Jerome D. Goldberg
Attorney—Holman & Stern

[57] ABSTRACT

Process for retarding or inhibiting the growth of transplanted malignant tumors by administering to a tumor-bearing mouse an effective dose of polyinosinic-polycytidylic acid.

1 Claim, 9 Drawing Figures

PATENTED SEP 19 1972

INVENTOR,
HILTON B. LEVY
BY Holman & Stern
ATTORNEYS

INVENTOR,
HILTON B. LEVY
BY Holman & Stern
ATTORNEYS

INHIBITION OF TRANSPLANTED TUMOR GROWTH BY POLYINOSINIC-POLYCYTIDYLIC ACID IN MICE

This invention relates to a method for inhibiting the growth of tumors and to a composition useful for such treatment, and relates more particularly to a method for inhibiting transplanted malignant tumor growth in mice.

The field of cancer therapy has been extensively studied in recent years and, yet, relatively few effective materials have been found which will inhibit or retard the growth of transplanted malignant tumors. The discovery of additional effective substances represents a significant contribution to this important area.

It has now been found that the synthetic double-stranded RNA, polyinosinic-polycytidylic acid, has significant inhibitory effect on the growth of a large number of transplanted malignant tumors in mice. In some instances, initiation of treatment after the tumor was grown to moderate size, even caused a regression of the tumor.

Thus, it is a basic object of the instant invention to provide a new treatment for inhibiting or retarding tumor growth, particularly transplanted malignant tumor growth in mice, by administering effective quantities of polyrI:rC to tumor-bearing host animals.

This and other objects of the instant invention will be better understood by consideration of the following detailed description and particularly the illustrative Examples which refer to the accompanying drawings wherein.

Figure 1:
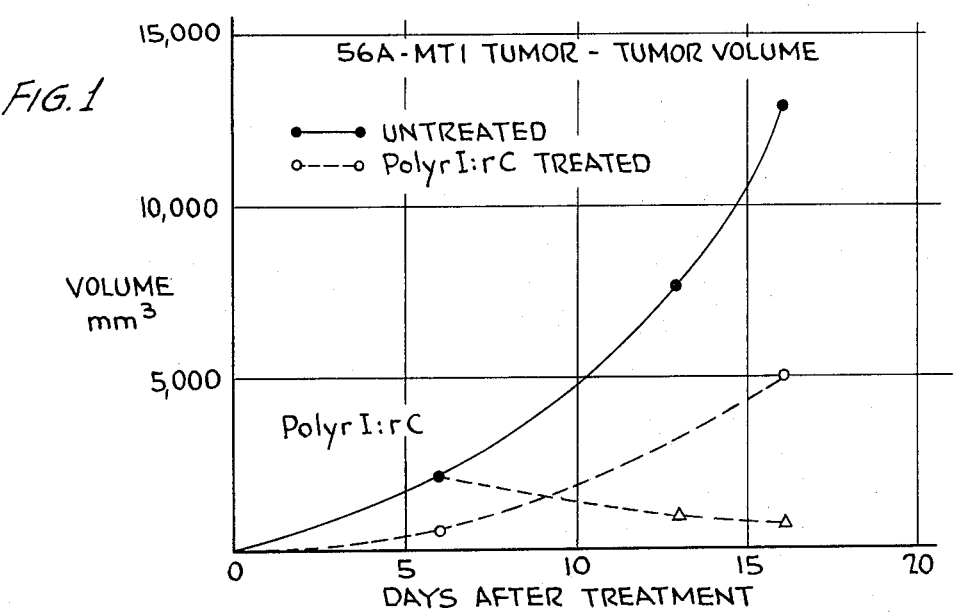
FIG. 1 is a graphical representation of the effect of polyrI:rC on growth rate of the MT-1 tumor.

PolyrI:rC is a known material and reference may be made to Field et al., Proceedings of the National Academy of Science, Vol. 58, p. 1,004 (1967), the substance of which is incorporated herein in its entirety by reference, for further details in this regard.

Basically, for the majority of the tests to be described hereinafter, polyriboinosinic acid (hereinafter "polyrI"), and polyribocytidylic acid (hereinafter "polyrC") were purchased from P-L Biochemicals. They were heterogeneous in size, with molecular weights in excess of $10^5$. They were dissolved in a concentration of 1 mg/ml in 0.85 percent NaCl containing 0.01 M phosphate buffer at pH 7.2. A Dounce homogenizer was used to facilitate solution. The solution was warmed to 30° C. and the polyrC was poured into the polyrI while constantly being mixed. In some experiments, equal volumes of solution were mixed. Such a mixture contained a slight molar excess of polyrC. In later experiments, equimolar mixtures were used. One M $MgCl_2$ solution was added to a final concentration of $5 \times 10^{-3}$. There was a hypochromic shift of about 35 percent, indicating that the base-paired, double-stranded structure had formed.

The general schedule of treatment described in the immediately following Examples with mice was administration of about 100 $\mu g$ to each mouse on Mondays, Wednesdays and Fridays, 24 – 48 hours after implantation of the tumor, except for the L1210 leukemia, where injections were given daily. The route of administration was intraveneous or intraperitoneal as indicated in the Figures, although intramuscular administration is equally effective and subcutaneous injection is satisfactory, Experiments have been conducted in mice. For mice, the general dosage is from about 5 to about 25 mg/kg, effectiveness beginning to diminish below about 5 mg/kg with no toxicity resulting in the upper range of about 25 mg/kg.

Ordinarily, treatment on alternate days is preferred, although, in some instances, daily treatment is utilized.

EXAMPLE 1

The histories of the various tumors described in this Example are as follows:

Neoplasm J 96132 arose spontaneously in a female 105 C57 BL/KaLw mouse, 11-½ months of age. Spleen and liver involvements were noted at necropsy. The neoplasm is classified as a reticulum cell sarcoma type A. It has been transplanted through 18 generations in syngeneic mice. At the 12th generation, the neoplasm was frozen in liquid nitrogen and recovered 21 months later. It is now carried in the solid form (subcutaneous transfer) or in the ascites from (intraperitoneal transfer).

Neoplasm B 1237 arose in a SJL strain mouse 10 months of age. It has been transplanted subcutaneously through five generations and is classified as a generalized lymphocytic lymphoma.

The MT-1 tumor was induced by human adenovirus 12 in neonatally thymectomized Balb/C mice. It was passaged as a 15 percent suspension of tissue in 199 medium in weanling male Balb/C mice; 0.2 ml, of the material was injected subcutaneously, the tumor was in the 50th generation passage.

The fibrocarcoma was a spontaneous tumor that originated in Balb/C mice. When used, it was in the 30th generation passage.

The L 1210 leukemia was carried in strain EBA/2 and tested in (C57Bl/6 times DBA/2) $F_1$ hybrid male mice, Implantation of the tumor was by intraperitoneal injection of $10^5$ cells per mouse.

Each experiment consisted of 8 to 10 treated, and an equal number of untreated mice. Two or more independent experiments were formed with each tumor, except for the fibrosarcoma on which only one was done. In general the mice weighted about 20 g. One expression of the data is as cumulative days of survival; the number of cumulative survival days on day $n$ for a group of mice on day $n$ is obtained from the expression:

$$\text{Cum. surv. days}_n = \sum_{0}^{n} (i) \times \text{No. of animals alive on each day}_i$$

where $i$ is the number of each experimental day up to $n$. Thus, 9 animals surviving for 3 days contributed $(9 \times 1) + (9 \times 2) + (9 \times 3) = 54$ cumulative survival days.

Other methods of data presentation are the percentage of the animals dead as a function of time and mean day of death, ± standard error of the mean.

Three effects of polyrI:rC were noted: (1) a decrease in growth rate of the tumor, (2) an increase in survival time of animals, and (3) regression of an already grown tumor. All tumors tested showed one or more of these effects.

It is difficult to quantify tumor volume accurately, particularly when the tumor has become large and irregular in shape. The MT-1 tumor could be measured for about the first 2 weeks of its development. An estimate was made of its length, width, and height, and the volume was calculated as the product of these three dimensions.

FIG. 1 shows that treatment with polyrI:rC, beginning two days after transplant of the tumor, inhibits its growth. 40 animals were inoculated with MT-1 tumor. 2 days later, intraveneous treatment as initiated in half the mice (day 0). 6 days later, 10 of the untreated animals began receiving treatment. Initiation of treatment after the tumor had obtained modest size, led to massive necrosis and sloughing in four of the 10 animals treated and a marked reduction in tumor size in the six others. After a few weeks, however, these tumors increased in volume again, despite continued treatment. No studies were made to determine if larger doses of polyrI:rC could prevent re-growth or cause another rejection of the tumor, once it had re-grown. In one experiment with three week old mice, the hemorrhagic regression was accompanied by sudden death of all the treated mice, possibly because of the resorption of the necrotic tissue.

Figure 2:
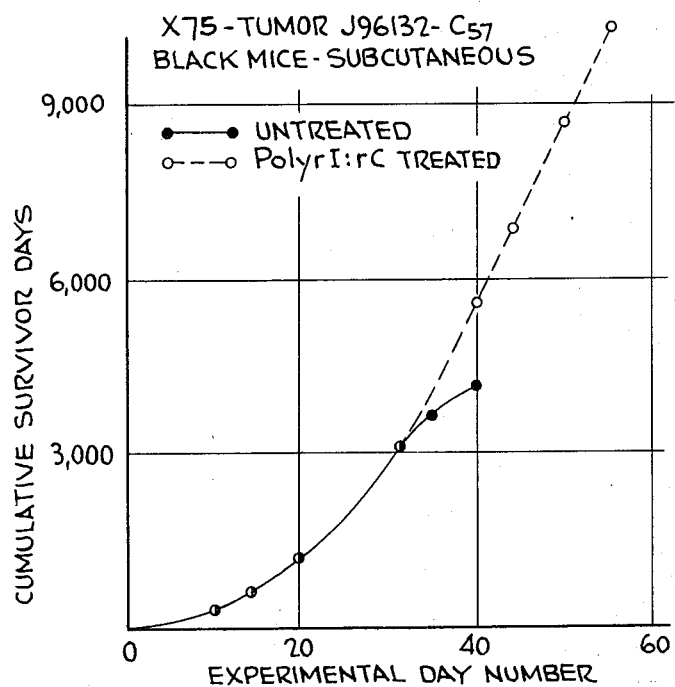
FIG. 2 is a graphical representation of the effect of polyrI:rC on cumulative survival days of animals bearing the J96132 tumor.
Figure 2A:
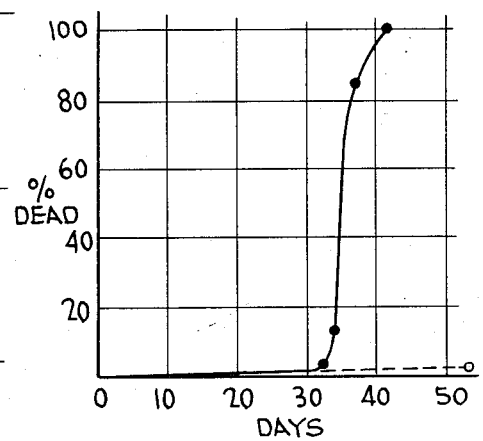
FIG. 2A is a graphical representation of the effect of polyrI:rC on the percent dead of animals bearing the J96132 tumor.

The most marked effect of the drug on survivial time was in tumor J96132 (a reticulum cell sarcoma in C 57 Kaplan black mice), either in ascites form or as a solid subcutaneous tumor. FIG. 2 plots cumulative survival days and FIG. 2A plots percentage dead for the subcutaneous form of the tumor. Ten tumor-bearing mice were treated with 100 $\mu$g of polyrI:rC, intraperitoneally three times weekly, starting 2 days after tumor implantation. It can be seem that all the untreated animals were dead by day 41, and all the treated animals were alive. When the tumor was in the ascites form, the untreated animals were all dead at 42 days, and all the treated animals were still alive 6 weeks later. 2 weeks after the cessation of treatment, microscopic examination of the site of the primary transplant revealed a few viable tumor cells surrounded by a mass of necrotic cells. Metastatic cells could not be found in the liver or spleen. About 30 percent of all the animals originally inoculated with this tumor were still alive 2 months after treatment was stopped and showed no gross evidence of tumor.

In one experiment, the J96132 subcutaneous tumor was allowed to grow to about 2–4 mm in diameter before initiation of treatment with 200 $\mu$g of polyrI:rC intraperitoneally every other day. Within 8 days, the tumors were no longer palpable in any of the 10 animals, while the tumors in 10 untreated animals were slowly increasing in volume. After 34 days, 9 of the 10 untreated animals were dead, but all the treated animals were alive.

Table 1 shows data for other tumors. Although they were less responsive, the drug exerted protective action in all cases. Only one treatment schedule was used — 100 $\mu$g per mouse 3 times weekly. There was no gross evidence of toxicity of the polyrI:rC at these levels.

TABLE 1

Effect of PolyrI:rC on mouse tumors

| Tumor | treatment route | Cumulative survival days (No. of Animals) | | Mean day of death ± S.E. of Mean | |
|---|---|---|---|---|---|
| | | Treated | untreated | Treated | untreated |
| J96132-reticulum cell sarcoma (ascites) | I.P. | (10) | (10) | 77.0*±4.8 | 39.2±1.2 |
| J96132-reticulum cell sarcoma (subcutaneous) | I.P. | (40) | (40) | 87.0¹±6.3 | 38.0±1.7 |
| Fibrosarcoma | I.V. | 7516(100) | 6266(10) | 38.0±1.3 | 25.3±2.5 |
| B1237-lymphoma (ascites) | I.V. | 900(18) | 420(18) | 15.2±0.54 | 10.5±0.51 |
| MT-1 tumor (subcutaneous) | I.V. or I.P. | 4854(20) | 3079(20) | 32.9± 0.82 | 26.2±0.28 |
| B-1237-lymphoma (subcutaneous) | I.V. | 1380(20) | 1180(20) | 16.9±0.41 | 13.2±0.54 |
| L1210 leukemia** | I.P. | (30) | (30) | 12.9 | 9.1 |

With the exception of the J96132 reticulum cell sarcoma, all animals ultimately died. (See also FIG. 2A) I.V., intravenous; I.P. intraperitoneal.

* Mean day of death of the animals that died. About 30% of all the animals treated have survived, although treatment had been stopped at about day 50.

** Tested by the Cancer Chemotherapy National Service Center, National Cancer Institute, in their standard screening procedure. In this test system, differences of this magnitude are highly significant.

Table 2 shows the percent increase in median survival as compared with controls for various tumors, wherein the treatment, in most cases, was 150 – 200 $\mu$g/mouse, three times weekly, by the intraperitoneal route.

TABLE 2

| TUMOR | % Increase in Median Survival OVer Control |
|---|---|
| J96132-Reticulum cell sarcoma (subcutaneous) | 130* |
| J96132-Reticulum cell sarcoma (ascites) | 96* |
| Carcinosarcoma Walker 256 | 100 |
| Reticulum cell sarcoma RCSL | 89 |

| | |
|---|---|
| Ehrlich Ascites tumor | 70 |
| S91 Melanoma | 55 |
| Fibrosarcoma | 52 |
| B1237-lymphoma (ascites) | 45 |
| L1210 Leukemia | 42 |
| Plasma cell YPC-1 | 39 |
| B1237-lymphoma (subcutaneous) | 28 |
| MT-1 tumor (subcutaneous) | 26 t |
| Reticulum cell sarcoma ovarian | 20 |
| Leukemia P 388 | 20 |
| Leukemia K1964 | 12 |

With the exception of the J96132 reticulum cell sarcoma, some Ehrlich ascites tumors, and a few Walker carcinosarcoma all animals ultimately died.
*Mean day of death of the animals that died. About 30% of all the animals treated have survived, although treatment had been stopped at about day 50.

In addition to the above, comparable results were obtained with a melanoma, the Bittner tumor and Ehrlich Ascites tumor.

Figure 3:
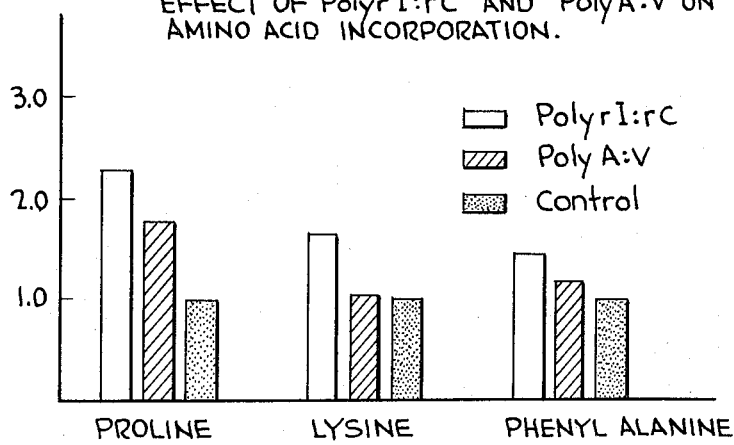
FIG. 3 is a graphical representation of the effect of polyrI:rC and poly A:V on amino acid incorporation into primary mouse embryo cells.

A second aspect of the activity of polyrI:rC may be as a direct chemotherapeutic agent. PolyrI:rC is a double stranded RNA, the homopolymers of which can code for the synthesis of polypeptides in a suitable cell free test system. PolyrC, for example, should code for the synthesis of poly-proline. If the polyrC component of the polyrI:rC were to be responsible for the synthesis of poly-proline in the cell, one might imagine any number of cellular reactions to the presence of this "nonsense" protein. PolyrI:rC does stimulate the incorporation of poly-proline into the proteins of L-cells, but it also stimulates incorporation of a number of other amino acids for which it should not code. Further, polyadenylic-polyurydylic acid (hereinafter "polyA:U") also stimulates proline incorporation, for which it does not code, and it does not stimulate phenylaline incorporation, for which the polyurydylic acid would code. Note, for example, FIG. 3, wherein 1° M.E. cells were exposed for 16 hours to 100 $\mu$g/ml of the RNA in the presence of BME 5 percent fetal calf serum. The medium was changed to BME without serum for 1 hour and then the cells were exposed to the labelled amino acid for 30 minutes. Radioactivity was determined on the acid insoluble portion of the cells. ONe can conclude that the double-stranded RNA's do stimulate amino acid incorporation into proteins, but are not acting intracellularly as synthetic messenger RNA's. The nature of the proteins made is under study.

Figure 4:
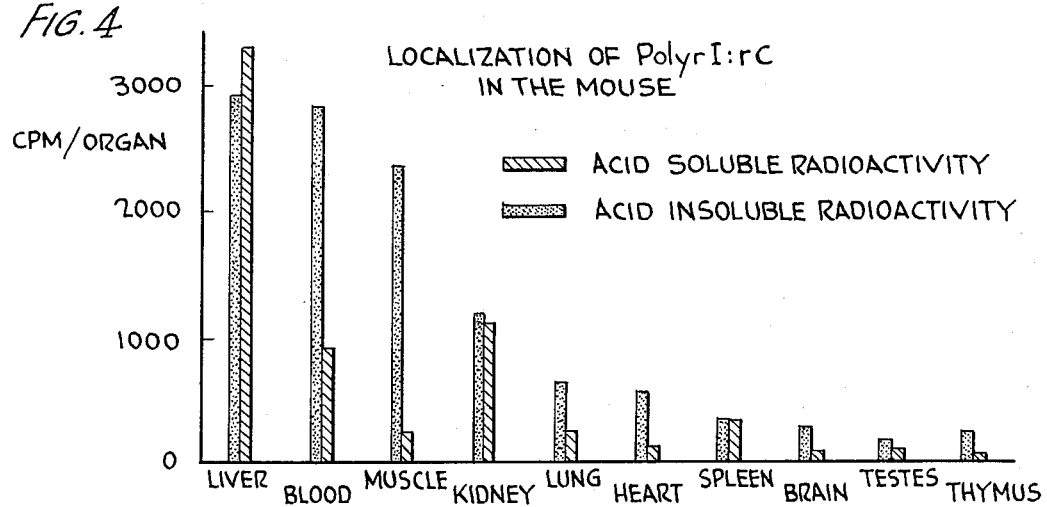
FIG. 4 is a graphical representation of the effect of polyrI:rC on proline incorporation into various organs of a normal mouse.

The increased amino acid incorporation is also seen in animals. Three normal NIH white mice were injected intraperitoneally with 200 $\mu$g/mouse of polyrI:rC. Three mice served as controls. 16 hours later, the animals were exposed to 10 $\mu$c of $C^{14}$ proline for 40 minutes and the radioactivity incorporated into the acid insoluble components of a number of organs was measured. The results are summarized in FIG. 4. On can see that many of the organs showed what, by this criterion, could be considered as increased rates of protein synthesis.

Figure 5:
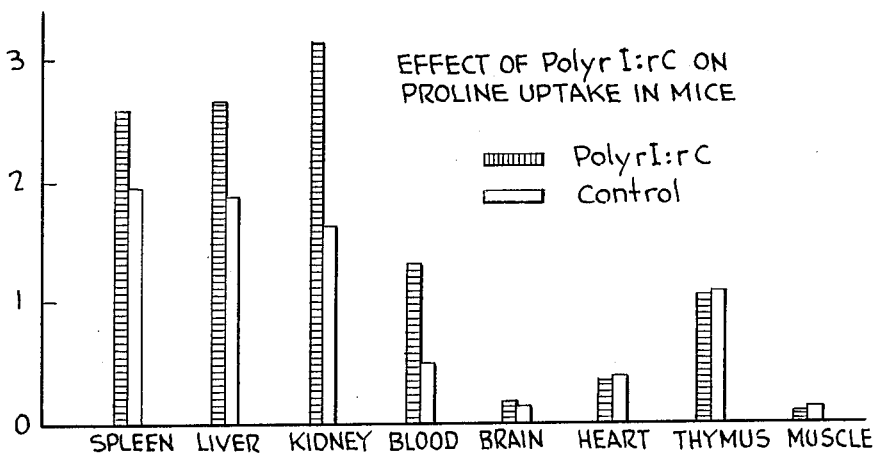
FIG. 5 is a graphical representation of the effect of polyrI:rC on proline incorporation into various organs of C57 black mice bearing Reticulum Cell Sarcoma J96132, with the conditions essentially the same as for FIG. 4.

Additional experiments were done with C57 black Kaplan strain of mice bearing the J96132 reticulum cell sarcoma, the tumor most sensitive to polyrI:rC. This strain of animals is highly reactive to polyrI:rC in their ability to produce interferon. As before, the animals received polyrI:rC over night and $C^{14}$ proline in the morning. As shown in FIG. 5, there was strong stimulation of proline incorporation into the various normal organs. However, polyrI:rC treatment caused marked inhibition of protein synthesis in a tumor. This inhibition ranged from 85 to 95 percent indifferent experiments. Dose response curves and kinetic studies have not been completed on this effect. It also appears reasonable to think that this inhibition of protein synthesis would be prohibitory to tumor growth. It is possible, however, that the tumors had been damaged by some other mechanism and that the decreased protein synthesis is a reflection of this, rather than a cause of the tumor in addition.

Figure 6:
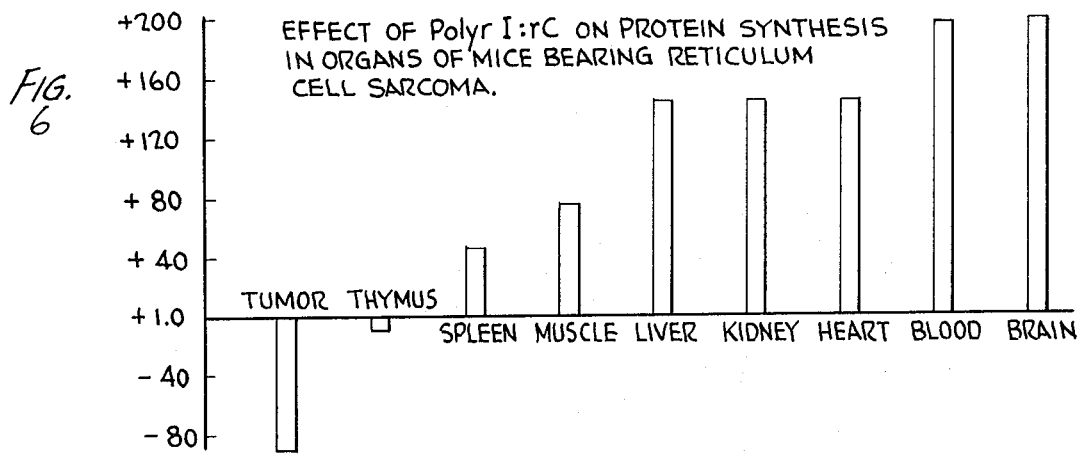
FIG. 6 is a graphical representation of the effect of polyrI:rC or uridine incorporation into various organs of C57 black mice bearing Reticulum Cell Sarcoma J96132, with the conditions essentially he same as for FIG. 4 with the exception that 50 $\mu c$ $^3H$ uridine was used instead of proline.

The complex effect of polyrI:rC on RNA metabolism in tissue culture, depending on dose and time, shows inhibition or stimulation. The effect of the compound on an RNA metabolism in organs of mice bearing the J96132 tumors is shown in FIG. 6. In general, RNA synthesis is affected somewhat less than protein synthesis, except for the tumor. There, polyrI:rC treatment leads to a marked inhibition of RNA synthesis.

The effect of polyrI:rC on thymidine incorporation into DNA can be either enhancement or inhibition, depending on the tissues studied. Note Table 3.

TABLE 3

Effect of PolyrI:rC on Thymidine Incorporation into Various Cells

| Cells | Monolayer or spinner | Incubation w/PIC for | %Inhibiton or enhancement | DOSE |
|---|---|---|---|---|
| L 929 Y | Spinner | 3 hours | +24 | 100 $\mu$g |
| | | 16 hours | +68 | 25 $\mu$g |
| | | 16 hours | +42 | 100 $\mu$g |
| L 929 Y | Monolayer | 2 hours | No Effect | |
| | | 48 hours | +37° | 30 $\mu$g |
| | | 96 hours | +32 | 30 $\mu$g |
| Vero CCL 81 | Monolayer | 2 hours | −53 | 100 $\mu$g |
| | | 16 hours | −34 | 50 $\mu$g |
| Rabitt Kidney Cells | Monolayer | 3 hours | No Effect | |
| | | 16 hours | −42 | 20 $\mu$g |
| P3 Cells (Burkitt) | Suspension | 2 hours | −32 | 25 $\mu$g |
| | | 16 hours | No Effect | |
| Primary Mouse Embryo Cells | Monolayer | 2 hours | No Effect | 50 $\mu$g |
| | | 16 hours | −60 | 50 $\mu$g |

Cells were incubated with the indicated concentration of polyrI:rC. Cultures are pulsed for 45 minutes with 2.5 $\mu$c of $^{14}$C thymidine/100 ml of medium. The cells were washed twice with cold PBS, suspended in cold 10% TCA, washed with 0.1% cold TCA and hydrolyzed for 15 minutes at 100° C in 5% TCA. Radioactivity and DNA concentrations were determined on aliquots of the hydrolyzate.

It can be seen that there is inhibition in primary mouse embryo, rabbit kidney, and Vero cell monolayers. On the other hand, there appears to be stimulation in L cells, particularly on suspension culture.

At the concentrations studied here, polyrI:rC is without gross toxicity on normal tissue culture cells and there is no pronounced effect on tissue culture cell gross rate. It is surprising to see such pronounced metabolic alterations, without corresponding biological effect. This attests either to the tremendous flexibility of living matter, or to the possibility that it is not true alterations in macromolecule synthesis that is being measured, but rather may be permeability or precursor pool size that is affected. This latter possibility is under study, but limited data suggests pool sizes are not greatly altered.

Figure 7:
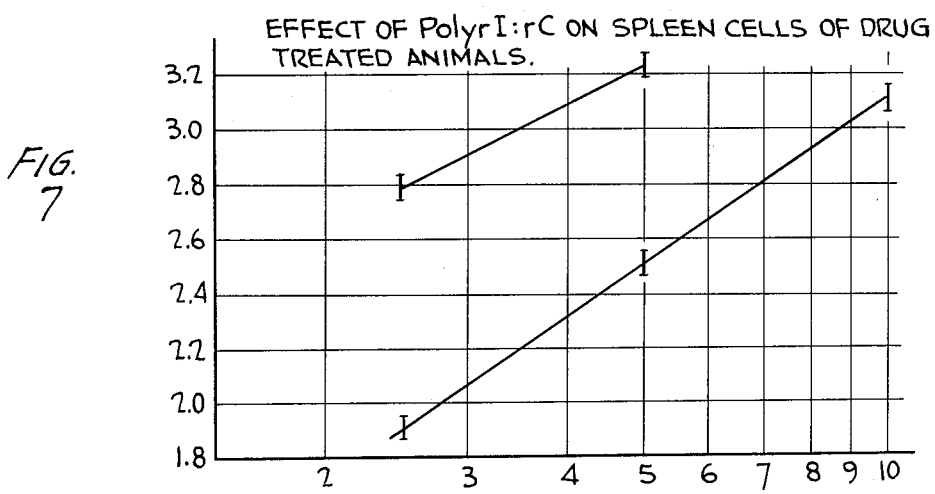
FIG. 7 is a graphical representation of the effect of polyrI:rC on the spleen cells of drug treated donor animals.

A third facet of the anti-tumor action of polyrI:rC is its ability to enhance cell mediated defense mechanisms against foreign antigens. If spleen cells from adult mice are injected into newborn $AF_1$ hybrids, one of whose parents if the strain of the donor mice, the donor cells develop a graft vs. host reaction, which affects the recipient animals in a number of ways. One of these ways is the establishment of esplenomegally in the recipient. The degree of spleen enlargement is a function of the activity and the logarithm of the number of donor cells. This test is useful in evaluating immune suppresive drugs and antilymphocyte serum. The depressed reactivity of the spleen cells from drug treated donor animals results in a lesser splenomegally in the recipient than does spleen cells from untreated donors. When donor mice are given polyrI:rC their subsequently removed spleen cells enhanced immunological reactivity against the foreign antigens in the recipient and result in increase splenomegally, as seen in FIG. 7. Comparison of the position of the two parallel lines obtained from injecting different numbers of cells reveals that polyrI:rC of 1 μg/mouse causes greater than a doubling of the effectiveness of the cells in the graft versus host reaction, while lesser amounts of polyrI:rC produced a definite but lesser stimulation. Enzymatic hydrolysis of the polyrI:rC destroys its enhancing ability.

It is reasonable to think that enhancement by polyrI:rC of such cell mediated rejection of foreign antigens could effectively act against the foreign antigens of the transplanted tumor, facilitating the rejection of the tumor. Indeed, the inhibition of macromolecule synthesis discussed earlier may be a manifestation of such cellular immunological activity. Such enhancement of immunological reactivity by polynucleotides has been observed repeatedly before.

Most of the chemotherapeutic studies that have been done have been at 150 to 200 μg/mouse given 3 times weekly by intravenous or intraperitoneal route. Studies with increased dosages have been unfruitful because at significantly higher levels toxicity to the host animal becomes evident but the marked enhancement of graft versus host reaction of 1 μg/mouse would suggest that this would be a desirable dosage to try. The $LD_{50}$ in mice is difficult to state precisely, but repeated doses of 1 mg/mouse leads to death in more than half the animals.

Figure 8:
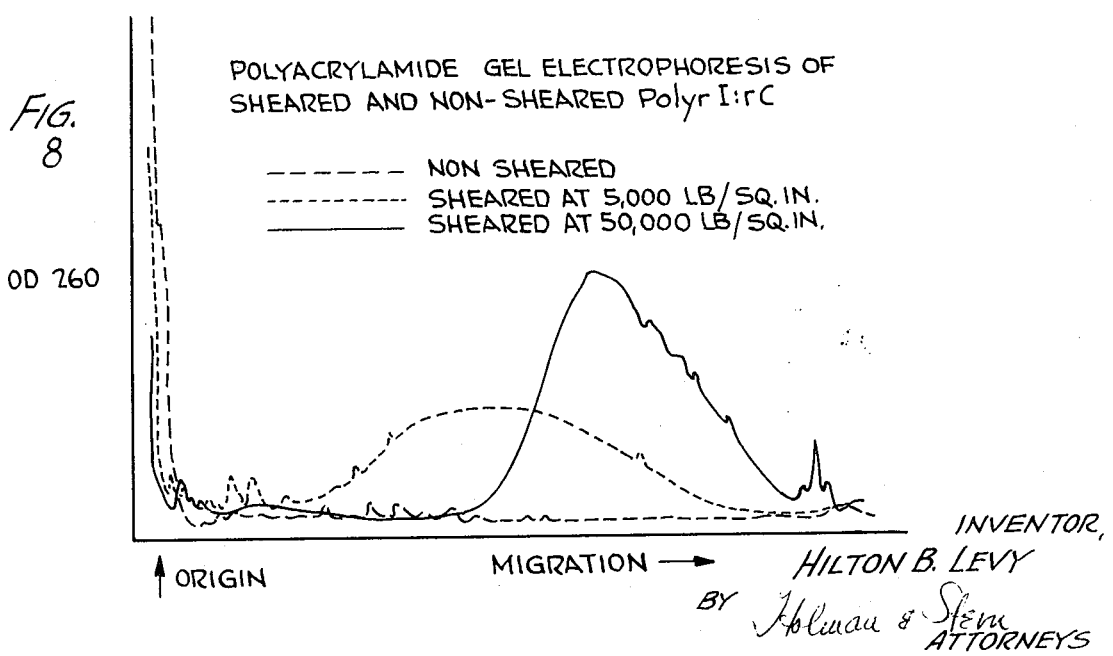
FIG. 8 is a graphical representation of the effect of hydraulic shearing on molecular size of polyrI:rC as revealed by gel electrophoresis.

The polyrI:rC used has a molecular weight probably in excess of $5 \times 10^7$ daltons, and migrates little if at all in polyacrylamide agar gel electrophoresis. Hydraulic shearing decreases its molecular weight, with a hydraulic pressure of 50,000 pounds per square inch reducing the molecular weight to perhaps $10^6$ daltons. Electrophoretic behavior of such sheared materials is shown in FIG. 8. PolyrI:rC, 1 μg/ml in 0.5 M NaCl, pH 7.7, was subjected to hydraulic shearing at 6° C in a Ribi cell fractionator. The sheared material was electrophoresed for 2 hours on a 7 cm 2 percent polyacrylamide gel at 7 volts/cm. The O.D. tracings were obtained with a Gilford spectrophotometer gel scanner.

In experimental work it has been seen that the toxicity of the smaller material is much less than of the unsheared compound. Doses of 5 mg/mouse have been tolerated. Studies of the effectiveness of this sheared material indicate that its interfering inducing ability and its inhibitory action on transplanted tumors are unimpaired.

Studies were undertaken to determine if the relatively specific damage to the tumor is attributable to selective concentration of the compound in the tumor. For this purpose radioactive polyrI:rC was used, labelled with tritium in the polyC or $C^{14}$ in the polyrI:rC or double labelled. In monolayers of mouse L cells about 40 percent of the radioactivity of the polyrI:rC originally added to the medium became cell associated which amount was much greater than the percentage of uridine taken up. Note Table 4.

TABLE 4

Incorporation of Radioactive PolyrI:rC ($C^{14}$) into L Cells

| | TCA Insol. | % Inhib. | % Incorporation TCA Sol. | % Inhib. |
|---|---|---|---|---|
| $^3$H Uridine No ACM | 0.074 | | 0.026 | |
| + ACM | 0.0064 | 90 | 0.036 | 0 |
| Radioactive No ACM | 20.7 | | 22.6 | |
| poly I:poly C+ACM | 0.17 | 99+ | 0.42 | 99 |

There was extensive breakdown of the polyrI:rC into acid soluble forms, which accounted for about 50 percent of the total cell associated radioactivity. It is not known whether any of the acid insoluble radioactivity is input polyrI:rC or is merely the result of incorporation of breakdown product into cell nucleic acids. As expected, the incorporation of labelled uridine into RNA was strongly inhibited by actinomycin D, while the association of this radioactive uridine with cells in an acid soluble form was unaffected by actinomycin. Actinomycin strongly blocked the association of labelled polyrI:rC with the cell, both as acid insoluble and acid soluble material. One possible explanation for this is that the actinomycin prevents the entry of polyrI:rC into the cell and thus the compound cannot be broken down to acid soluble materials and acid insoluble forms. In mice, labelled polyrI:rC becomes associated as acid insoluble and acid soluble material in most of the organs. There is no particular selective concentration of the compound into the tumor.

Further studies are currently under way to investigate the effectiveness of lower molecular weight preparations of polyrI:rC, the toxicity of which appears to be significantly less than the higher molecular weight material.

Thus, the instant invention provides a method for inhibiting the growth of transplanted tumors, in some instances even causing regression of a tumor grown to moderate size prior to treatment.

What is claimed is:

1. A process for retarding the growth of transplanted mice tumors selected from the group consisting of J96132 reticulum cell sarcoma, carsinoma Walker, reticulum cell sarcoma RCSL, Ehrlich tumor, S91 melanoma, fibrosarcoma, B1237 lymphoma, L1210 leukemia, plasma cell YPC-1, MT-1 Tumor, reticulum cell sarcoma ovarian, leukemia P388 and leukemia K1964 which comprises administering to a tumor-bearing mouse a dose effective to retard the growth of such tumors, of polyinosinic-polycytidylic acid comprising an approximately equimolar mixture of polyinosinic and polycytidylic acids, said polyinosinic-polycytidylic acid being hydraulically sheared and having a molecular weight of about $10^6$ daltons.

* * * * *